Sept. 22, 1942.　　　H. V. REED　　　2,296,538
FRICTION CLUTCH
Filed March 17, 1941　　　2 Sheets-Sheet 1
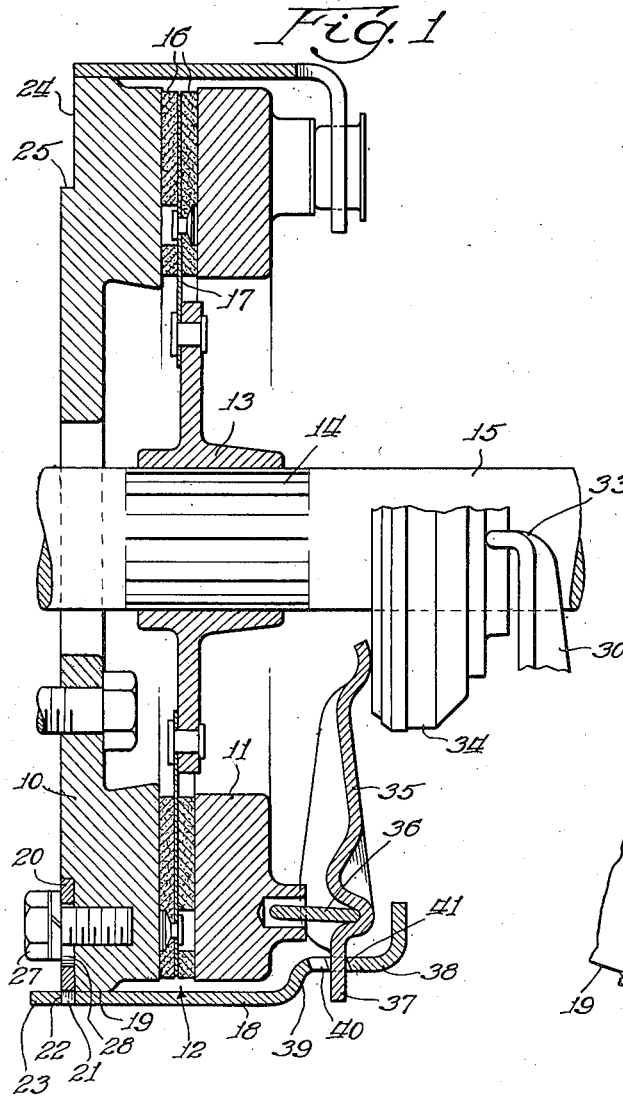
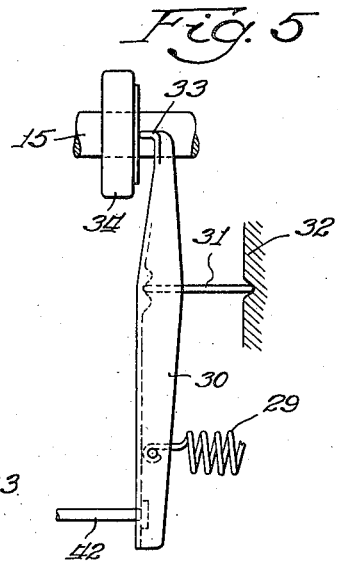
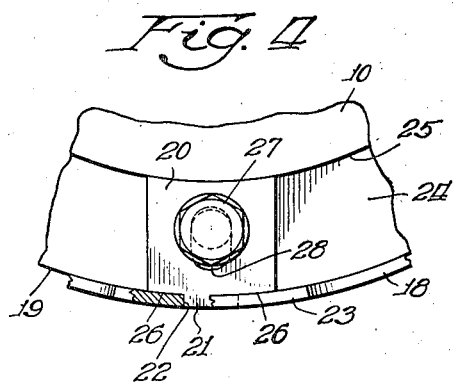
Inventor:
Harold V. Reed
By Edward C. Gritzbaugh
Atty.

Patented Sept. 22, 1942

2,296,538

UNITED STATES PATENT OFFICE 2,296,538

FRICTION CLUTCH

Harold V. Reed, Chicago, Ill., assignor to Borg-Warner Corporation, Chicago, Ill., a corporation of Illinois Application March 17, 1941, Serial No. 383,767

6 Claims. (Cl. 192—68)

This invention relates to friction clutches and has as its primary object to provide a clutch of extremely compact construction. Specifically, the invention aims to provide a clutch having a minimum overall diameter.

Other objects, the advantages and uses of the invention will become more apparent after reading the following specification and claims and after consideration of the drawings forming a part of the specification, wherein:

Fig. 1 is an axial sectional view through a clutch embodying the invention;

Fig. 4 is a detailed view, partly broken away, of a portion of the same; and

Fig. 5 is a schematic view of a portion of the clutch control mechanism.

Figure 2:
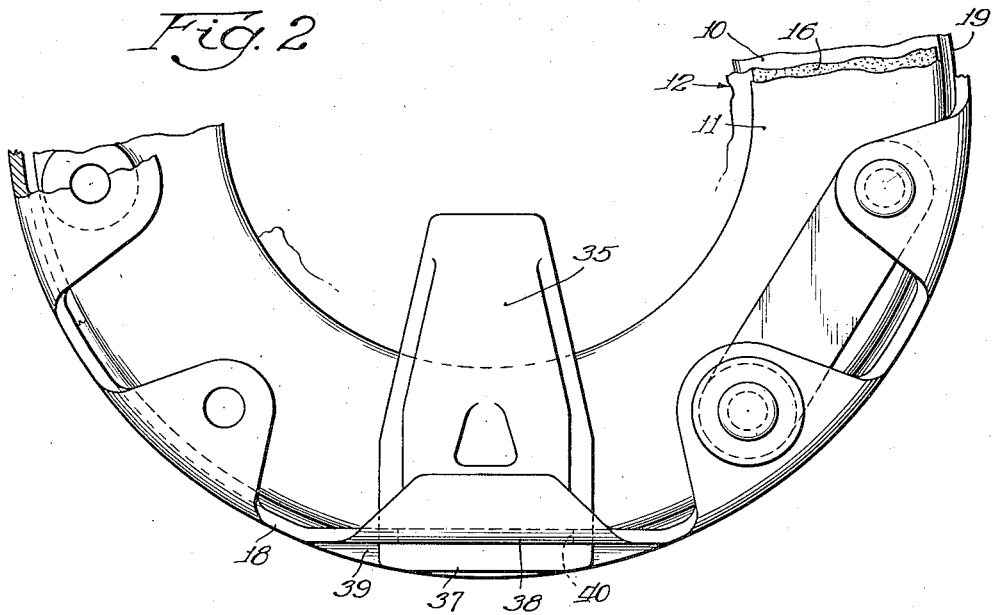
Fig. 2 is a rear elevation of a portion of such clutch.
Figure 3:
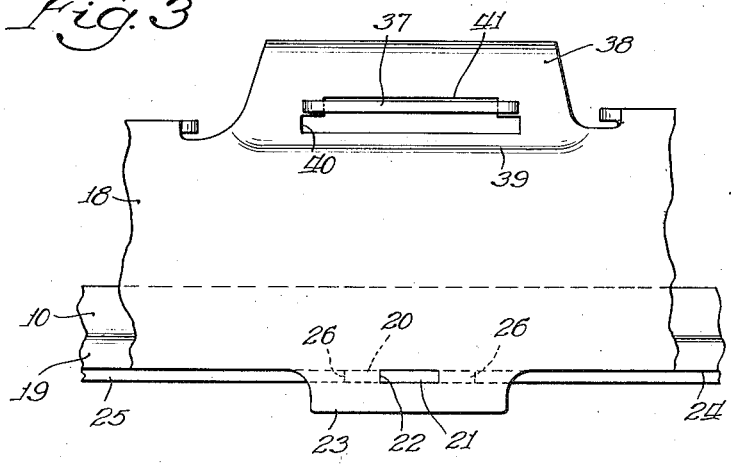
Fig. 3 is an inverted plan view of a portion of the same.

As an example of one form in which the invention may be embodied, I have shown in the drawings a clutch adaptable for use in a motor vehicle, said clutch comprising a driving member 10 which may be the flywheel of the vehicle engine, a pressure plate 11, and a driven member 12 adapted to be engaged between the driving member 10 and the pressure plate 11.

The driven member 12 includes a hub 13 splined at 14 upon a driven shaft 15 and a pair of facings 16 mounted upon the hub 13 through the medium of cushioning means 17.

Compactness is achieved by reducing the overall diameter of the clutch and by eliminating from the clutch structure per se, the conventional springs for engaging the clutch.

In the conventional clutch, there is provided a clutch cover which serves as a reaction member for the lever and spring mechanism, and this cover is attached to the flywheel by a flange projecting radially outwardly from the body of the cover. The present invention achieves reduction in the diameter of the clutch by eliminating this radially projecting flange and substituting therefor the arrangement which will now be described.

I provide a reaction member comprising a cylindrical sleeve portion 18 which is of only slightly larger diameter than the periphery of the driven element 12 and pressure plate 11. The sleeve portion 18 constitutes the region of maximum diameter of the reaction member, and is mounted upon the flywheel 10 by being fitted over a cylindrical turned periphery 19 thereof. It is secured in place by a plurality of flat retainer plates 20 each having a lug 21 extending into a lanced opening 22 in an ear 23 formed as an extension of the sleeve portion 18 of the reaction member. The forward face of the flywheel 10 is provided with an annular recess 24 which receives the retainer plates 20 permitting the latter to lie flush with the inner region of the flywheel. The inner ends of the retainer plates 20 are fitted against a shoulder 25 defining the inner extremity of the recess 24. The retainer plates 20 are provided with shoulders 26 which engage the inner surfaces of the ears 23 so as to support the retainer plates against radially outward movement. The retainer plates are attached to the flywheel by machine screws 27 extended loosely through openings 28 therein and threaded into the flywheel. Even though a screw 27 should not be drawn home securely, the retainer plate 20 will not be dislocated radially, because of the retention by the shoulder 25 and the inner surfaces of the ears 23 acting against the shoulder 26.

Axial compactness is achieved by eliminating self contained clutch engagement springs, and providing a single engagement spring 29 which acts against a lever 30 fulcrumed at 31 on a member 32 fixed to the vehicle chassis. The lever 30 acts at its other end 33 against a thrust bearing 34 slidable on the driven shaft 15. The thrust bearing 34 in turn transmits engaging pressure to the pressure plate 11 through the medium of a plurality of levers 35, each arranged to transmit thrust to the plate through a tilting strut 36, and fulcrumed at its outer end 37 in a fulcrum region 38 of the reaction member 18.

The fulcrum regions 38 are offset radially inwardly from the sleeve portion 18, the offset regions being indicated at 39. The lever ends 37 are extended through fulcrum openings 40 in the fulcrum portions 38 and are engaged against fulcrum edges 41 defined in said openings 40.

The load of the spring 29 may be taken off of the lever 30 by manual operating mechanism including a suitable control pedal or the like (not shown) and linkage including a pull link 42 acting against the outer end of the lever.

The retainer plates 20 secure the reaction member 18 against axial movement in either direction, thus rigidly positioning it with reference to the flywheel.

I claim:

1. In a friction clutch, a driven element, a pressure plate and flywheel arranged to engage said element between them, a reaction member having a sleeve portion encircling the flywheel and fitted on the periphery thereof, said sleeve portion having slotted regions projecting forwardly of the flywheel, and securing elements detachably attached to the forward side of the flywheel and having fingers projecting into the slots of said slotted region for securing the reaction member on the flywheel.

2. In a friction clutch, a driven element, a pressure plate and flywheel arranged to engage said element between them, a reaction member having a sleeve portion encircling the flywheel and fitted on the periphery thereof, said sleeve portion having a region projecting forwardly of the flywheel, and a securing element detachably attached to the forward side of the flywheel and having a portion interengaging with said forwardly projecting region of the reaction member for securing the reaction member against axial movement on the flywheel.

3. In a friction clutch, a driven element, a pressure plate and flywheel arranged to engage said element between them, a reaction member having a sleeve portion encircling the pressure plate and extending forwardly of said flywheel, and a securing element detachably attached to the forward side of the flywheel, said securing element having a portion extending radially outwardly and interengaging with the forwardly projecting region of said sleeve portion for securing said reaction member against axial movement on the flywheel, said reaction member having a region projecting rearwardly of the pressure plate and providing a fulcrum for a thrust transmitting lever.

4. A friction clutch as defined in claim 3, wherein said securing element is engaged against an inner surface of said sleeve portion and thereby supported against radial movement under centrifugal force.

5. A clutch as defined in claim 3, wherein said securing element is in the form of a plate member lying flatly against a forward surface of the flywheel, said clutch including a separate member for securing said plate member to the flywheel.

6. A clutch as defined in claim 3, including machine screws extended through said securing elements and threaded into the flywheel for detachably securing said elements to the flywheel.

HAROLD V. REED.